United States Patent [19]
Maske

[11] 3,888,510
[45] June 10, 1975

[54] STEP FOR MOTOR VEHICLE

[76] Inventor: Robert L. Maske, 1405 Broadway St., Iowa City, Iowa 52240

[22] Filed: Mar. 25, 1971

[21] Appl. No.: 127,967

[52] U.S. Cl. ............................................. 280/166
[51] Int. Cl. ............................................... B60r 3/02
[58] Field of Search ........................ 280/166, 164

[56] References Cited
UNITED STATES PATENTS

| | | | |
|---|---|---|---|
| 1,467,976 | 9/1923 | Gannon | 280/166 |
| 2,409,418 | 10/1946 | Carmichael | 280/166 |
| 2,665,921 | 1/1954 | Schetzer | 280/164 A |
| 3,561,786 | 2/1971 | Lentz | 280/166 |

Primary Examiner—Robert R. Song
Attorney, Agent, or Firm—Hill, Gross, Simpson, Van Santen, Steadman, Chiara & Simpson

[57] ABSTRACT

A step to assist entry into a vehicle is pivotally supported at one point below the door to the vehicle and slidably and pivotally supported at another point below the body of the vehicle but above the lowest part of the frame thereof.

5 Claims, 4 Drawing Figures

PATENTED JUN 10 1975 3,888,510

INVENTOR
Robert L. Maske
by Pendleton, Neuman,
Williams & Anderson
Att'ys 3,888,510

STEP FOR MOTOR VEHICLE

BACKGROUND

This invention relates to a step for a motor vehicle, and more particularly to a retractable step which is automatically moved into operative position when a door is opened, and automatically moved to retracted position when the door is closed.

Entrance into a motor vehicle is greatly facilitated when a step is positioned to provide support to a person entering or leaving the vehicle somewhere between ground level and the level of the floor within the vehicle. Such a step is particularly desirable when the floor level is relatively high above the ground, such as, for example, the cab of a pickup truck. Pickup truck bodies are often used in connection with campers, with enclosed living facilities taking the place of the open truck-bed of the conventional pickup truck. Especially when so used, it is desirable to provide a means enabling women and children to enter the cab in comfort and safety.

Previous attempts to provide a retractable step have not met with great success, primarily because of the relatively complicated nature and costly construction of such steps, but also partly because such steps reduced the road clearance of the vehicle. It is desirable that a retractable step not be placed below the level of the frame of the vehicle, for such a placement materially reduces its road clearance.

SUMMARY OF THE INVENTION

It is accordingly a principal object of the present invention to provide a retractable step having a simple and inexpensive construction, and which is relatively easy to manufacture and install.

It is another object of the present invention to provide such a step which is mounted on a motor vehicle in such a way that all of the components of the step and its supporting structure are above the lowest level of the frame of the vehicle, so that the road clearance of the vehicle is not reduced.

In one exemplary embodiment of the present invention, there is provided a support bracket adapted to be supported below the body of a motor vehicle, a pivot shaft supported on the bracket, a supporting arm pivotally supported on the pivot shaft for rotation about the pivot shaft and slidable longitudinally with respect to the pivot shaft, a step bracket adapted to be supported on the door of the vehicle, a step pivot supported on the step bracket, and a step member pivotally supported on the step pivot shaft for rotation about the step pivot shaft.

DESCRIPTION OF THE DRAWINGS

Reference will now be made to the accompanying drawings, in which.

DESCRIPTION OF THE PREFERRED EMBODIMENT

Figure 1:
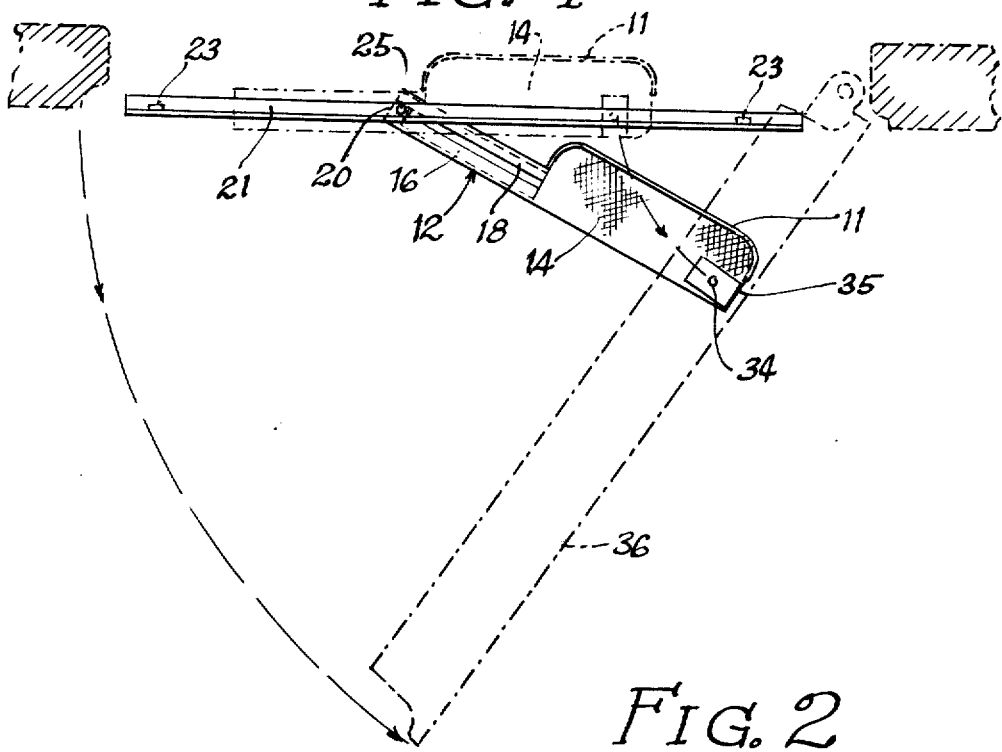
FIG. 1 is a plan view of an exemplary embodiment of the present invention.

Referring now to the drawings, the step arrangement illustrated in FIG. 1 comprises a step member 14 which is rigidly secured to a support arm 12.

The step member 14 comprises a generally flat plate which is of sufficient area to serve as a foothold, to assist a person in gaining entrance to the motor vehicle on which it is mounted. A flange 14 is secured to the edge of one side of the step member 14 and functions to prevent the user's shoe from slipping from the surface of the step member 11. One end of the support arm 12 is rigidly secured to the step member 11, preferably by welding. The support arm 12 is preferably formed of two elongate L-shaped bars 16 and 18, spaced apart throughout their length, and joined at their ends remote from the step member 14 by a bar 20, which is preferably welded to the bars 16 and 18 to form a rigid assembly.

An elongate L-shaped bracket 21 is secured to the lower portion of the frame 22 of the motor vehicle by means of bolts 23, passing through bolt holes provided in the vertical leg of the bracket 21. The bracket 21 is sufficiently long so that its bolt holes can be alinged with pre-existing bolt holes located in the frame at spaced locations near the door. At a position approximately central to the door, a pivot shaft 25 is supported by the horizontal part of the bracket 21, and passes through an aperture therein. The shaft 25 is preferably a bolt having a nut 26 threaded on it above the bracket 21. The bolt is received in the space between the bars 16 and 18 of the support arm 12 with its head 27 therebelow, whereby the support arm 12 is supported by the bracket 21 for pivotal movement and longitudinal sliding movement with respect thereto. A spring 28 surrounds the shaft 25 between the bracket 21 and the arm 12 to prevent extraneous movement of the arm 12. A pair of washers 29 and 30 surround the shaft 25 above and below the arm 12 to facilitate sliding movement of the arm 12. Another washer 31 surrounds the shaft above the spring 25, and a nut 32, threaded on the shaft 25 above the washer 31, allows adjustment of the tension of the spring 28. A further nut 33 is threaded on the shaft 25 above the nut 32, and rigidly secures the shaft 25 to the bracket 21. By changing the positions of the nuts 26 and 33 on the shaft 25, the level of support of the supporting arm 12 may be adjusted as desired.

The member 14 is connected by means of a pivot shaft 34 to a step bracket 35 secured to the lower portion of the door 36 of the motor vehicle. The step bracket 35 is generally U-shaped, with a generally vertical member 37, interconnecting upper and lower end members 38 and 39. The lower end member 39 is horizontal and is pivotally connected with the step member 14 by the shaft 34. The upper end member 38 lies against the interior surface of the door 36, to which it is bolted by a bolt 38'. An aperture 36' in the door bottom permits the end member 38 to enter the door during assembly. The door closes in ordinary fashion against the body 41 of the vehicle. No modification of either the door or the vehicle body is necesssary, because the gap between the body and door when the latter is in closed position is sufficient to accommodate the head of the bolt 38'.

The door 36 is normally closed against the body 41 of the vehicle, and the step member 14 is supported underneath the door 36 and the body 41, so that it is approximately flush with the side surface of the vehicle, shown in phantom in FIG. 1.

When the door 36 is opened, the door carries the step bracket 35 away from the body of the vehicle, the step member 14 traveling with it, and the supporting arm 12 pivots and slides with respect to the bracket 21. The step member 14 is therefore automatically brought into the position shown in full line in FIG. 1, just below the lowermost part of the door 36, and between the interior of the open door and the body 41 of the vehicle.

Figure 2:
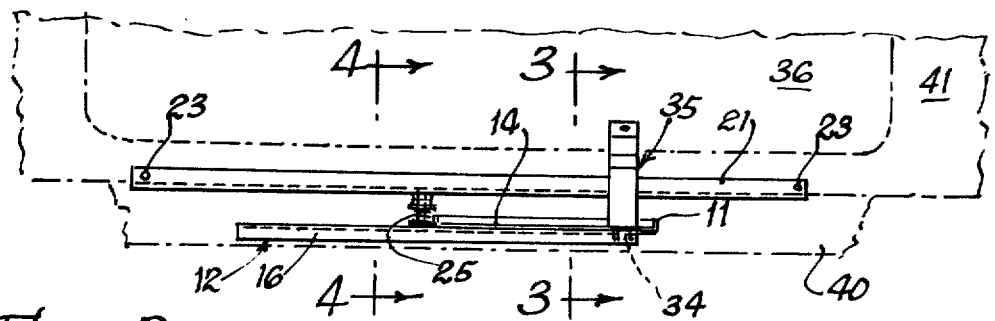
FIG. 2 is a side view of the apparatus of FIG. 1.
Figure 3:
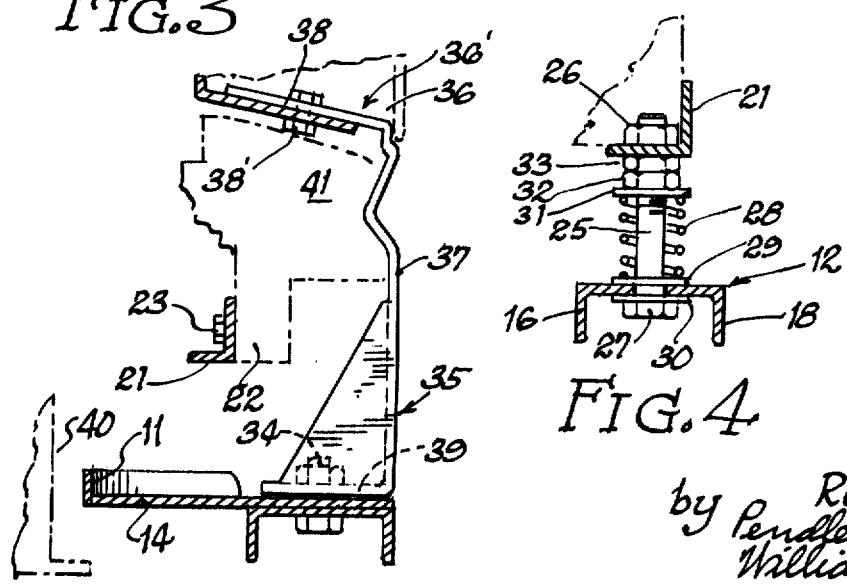
FIG. 3 is an end elevation, partly in section, of a portion of the apparatus of FIG. 1, taken along the section line 3—3 of FIG. 2.
Figure 4:
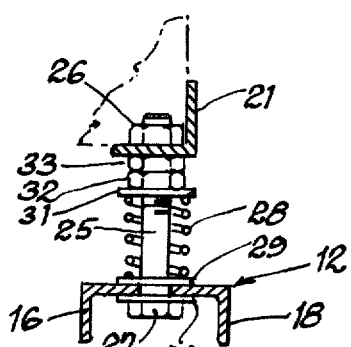
FIG. 4 is an elevation, partly in section, of a portion of the apparatus of FIG. 1, taken along the section line 4—4 of FIG. 2.

The entire step assembly is located above the lowest portion of the frame 40, as shown in FIG. 2. Therefore the use of the step does not reduce the amount of clearance between the bottom of the vehicle and the level of the road. The step assembly occupies so little space that it is at all times located outwardly of the frame 40 and forms a compact package.

By the foregoing an exemplary embodiment of the present invention has been described. However, modifications in its design and construction will be obvious to those skilled in the art and the scope of the invention is desired to be defined only by the appending claims.

What is claimed is:

1. A step for a motor vehicle, comprising a support bracket adapted to be connected to the body of a motor vehicle, a supporting arm pivotally secured to said support bracket, a step bracket secured to a door of said vehicle, a step pivotally secured to said step bracket, one end of said arm being rigidly connected with said step, and the other end of said arm supported for sliding movement relative to said support bracket, said arm comprising a pair of parallel, spaced-apart elongate members, said members being rigidly connected together at said other end of said arm, and including a vertical pivot shaft depending from said support bracket and passing between said members, and means secured to the bottom portion of said shaft to support said members.

2. The step according to claim 1, including a compression spring surrounding said shaft and interposed between said support bracket and said arm, for urging said arm downwardly relative to said support bracket.

3. Apparatus according to claim 2, wherein said shaft is threaded, and including a nut threaded on said shaft between said spring and said support bracket, whereby the compression of said spring may be adjusted by rotating said nut on said shaft.

4. Apparatus according to claim 1, wherein said shaft is threaded, and including a pair of nuts threaded on said shaft above and below said support bracket, whereby the vertical elevation of said arm may be adjusted by rotating said nuts on said shaft.

5. The step according to claim 1, wherein said step bracket is formed of a strip of sheet material into a generally U-shaped form having a central vertical leg, a lower horizontal leg, and an upper generally horizontal leg, means pivotally securing said lower horizontal leg with said step, and means securing said upper leg to the lower portion of said door, said upper leg being shaped to conform to the shape of the lower portion of said door, and to be retained between the lower portion of said door and the body of said vehicle when said door is closed against said body.

* * * * *